(12) United States Patent
Takatani et al.

(10) Patent No.: US 6,816,357 B2
(45) Date of Patent: Nov. 9, 2004

(54) SOLID ELECTROLYTIC CAPACITOR AND A FABRICATION METHOD THEREFOR

(75) Inventors: Kazuhiro Takatani, Osaka (JP); Mutsumi Yano, Osaka (JP); Mamoru Kimoto, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 2 days.

(21) Appl. No.: 10/388,486

(22) Filed: Mar. 17, 2003

(65) Prior Publication Data

US 2003/0174461 A1 Sep. 18, 2003

(30) Foreign Application Priority Data

Mar. 18, 2002 (JP) ........................................ 2002-074623

(51) Int. Cl.[7] .............................................. H01G 9/00
(52) U.S. Cl. ...................................................... 361/523
(58) Field of Search ................................. 361/523–541

(56) References Cited

U.S. PATENT DOCUMENTS 4,780,796 A    10/1988  Fukuda et al. .............. 361/433
6,154,358 A  * 11/2000  Fukaumi et al. ............ 361/523
6,215,651 B1 *  4/2001  Takada et al. ............... 361/523
6,333,844 B1 * 12/2001  Nakamura ................... 361/523

FOREIGN PATENT DOCUMENTS

JP    63-173313    7/1988

OTHER PUBLICATIONS

Preparation of Binder–Free Carbon Film by Electrophotic Deposition Method vol. 52 (2001), p143–144, with verified English Translation dated Jun. 9, 2003.

* cited by examiner

Primary Examiner—William H. Mayo, III
Assistant Examiner—Eric Thomas
(74) Attorney, Agent, or Firm—Armstrong, Kratz, Quintos, Hanson & Brooks, LLP

(57) ABSTRACT

A solid electrolytic capacitor of the invention includes a metal electrode employing a metal, a dielectric layer formed on a surface of the metal electrode and composed of an oxide of the metal, and a carbon material layer overlaid on the dielectric layer.

6 Claims, No Drawings

SOLID ELECTROLYTIC CAPACITOR AND A FABRICATION METHOD THEREFOR

BACKGROUND OF THE INVENTION

1. Field of the Invention

The present invention relates to a solid electrolytic capacitor and a fabrication method therefor, the solid electrolytic capacitor including a metal electrode used as an anode, and a dielectric layer of an oxide of the metal of the metal electrode and formed on a surface thereof. More particularly, the invention relates to a solid electrolytic capacitor featuring a decreased equivalent series resistance in high frequency regions.

2. Description of the Related Art

Recently, CPUs for use in personal computers have grown more powerful, bringing about a demand for a capacitor featuring excellent high-frequency characteristics with a low equivalent series resistance in high frequency regions as well as a great capacitance.

Capacitors employing a film, mica, ceramics or the like are known as the capacitor having the good high-frequency characteristics. Unfortunately, such capacitors generally have small capacitances and hence, these capacitors need be increased in size in order to achieve high capacitances. This also results in an increased cost.

More recently, electrolytic capacitors having high capacitances have been developed. The electrolytic capacitors fall into two types which include a capacitor employing a liquid electrolyte and that employing a solid electrolyte.

In the case of the electrolytic capacitor employing the liquid electrolyte, which is ion conductive, there is a problem that the equivalent series resistance is great in high frequency regions. Therefore, in an application requiring good high-frequency characteristics, the solid electrolytic capacitors employing the solid electrolyte are commonly used.

As disclosed in JP-A-63-173313, such a solid electrolytic capacitor is fabricated by anodizing aluminum or tantalum used as an anode member thereby forming an oxide of such a metal which defines a dielectric layer on the anode surface; and overlaying a layer of conductive polymer, such as polypyrrole or polythiophene, on the dielectric layer by chemical polymerization or electrolytic polymerization.

However, the conductive polymer, such as polypyrrole or polythiophene, has conductivity as small as a semiconductor. For instance, polypyrrole has a conductivity of $10^2$ S/cm and hence, satisfactory high-frequency characteristics are not obtained because of the increased equivalent series resistance in the high frequency regions.

SUMMARY OF THE INVENTION

It is an object of the invention to provide a solid electrolytic capacitor comprising a metal electrode used as an anode, and a dielectric layer of an oxide of the metal formed on a surface of the metal electrode, the capacitor achieving improved high-frequency characteristics with decreased equivalent series resistance in high frequency regions.

According to the invention, a solid electrolytic capacitor comprises: a metal electrode employing a metal; a dielectric layer comprising an oxide of the metal and formed on a surface of the metal electrode; and a carbon material layer overlaid on the dielectric layer.

Where the carbon material layer is overlaid on the dielectric layer of the metal oxide as suggested by the solid electrolytic capacitor of the invention, the electric charge transfer is increased in comparison with a case where a conductive polymer, such as polypyrrole or polythiophene, is used. The increased electric charge transfer leads to the reduction of equivalent series resistance in high frequency regions and hence, the solid electrolytic capacitor featuring excellent high-frequency characteristics is provided.

In a mode, the metal electrode employing the metal may be anodized to form the dielectric layer of the metal oxide on the surface thereof.

Examples of a metal used in the anode include valve metals such as aluminum, tantalum, niobium and titanium, and alloys thereof. Above all, aluminum is less costly and has stable dielectric characteristics.

It is preferred that the carbon material layer on the dielectric layer of the metal oxide is deposited by electrophoresis using the metal electrode formed with the dielectric layer as the anode. The reason is as follows. The dielectric layer of the metal oxide is fragile and contains therein micropores. When the carbon material layer is overlaid on the dielectric layer, a solution containing the carbon material penetrates into the micropores of the dielectric layer so as to swell the dielectric layer, which will be cracked or separated from the metal electrode. This leads to a fear that the carbon material layer may come into direct contact with the metal electrode through the cracked or separated portion of the dielectric layer, resulting in microshorts. However, in the above approach wherein the carbon material layer is overlaid on the dielectric layer by electrophoresis using the metal electrode formed with the dielectric layer as the anode, even if the dielectric layer is cracked or separated from the metal electrode, the metal electrode is re-anodized at a portion corresponding to the cracked or separated portion of the dielectric layer so as to form the dielectric layer thereat. Thus, the microshorts between the metal electrode and the carbon material layer are obviated.

In the solid electrolytic capacitor according to the invention, a usable carbon material is at least one selected from the group consisting of natural graphite, synthetic graphite, coke, carbon nanotube, acetylene black and metal-doped fullerene. The metal-doped fullerene may include an alkali metal.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Hereinafter, a solid electrolytic capacitor according to the preferred embodiments of the invention will specifically be described while comparative examples will be cited to demonstrate that examples of the inventive solid electrolytic capacitor are improved in high-frequency characteristics with decreased equivalent series resistances in high frequency regions. It is to be noted that the solid electrolytic capacitor of the invention should not be limited to the following examples thereof and suitable changes and modifications may be made thereto within the scope of the invention.

EXAMPLE 1

In Example 1, a metal electrode of an aluminum foil having a thickness of 60 μm was anodized to form a dielectric layer of aluminum oxide on a surface of the metal electrode of aluminum foil.

Next, a supersonic disperser was operated for 20 minutes to disperse 0.5 g of natural graphite powder in 120 ml of acetonitrile. Subsequently, the metal electrode formed with the dielectric layer of aluminum oxide and an SUS (stainless steel) electrode were immersed in the resultant dispersions. Using the metal electrode as an anode and the SUS electrode as a cathode, electrophoresis was carried out for 30 seconds under an applied voltage of 200 V, whereby a carbon layer of natural graphite was deposited on a surface of the dielectric layer of aluminum oxide.

Then, a counter electrode was formed by applying a silver paste to the natural graphite overlaid on the surface of the dielectric layer of aluminum oxide. The resultant assembly was encapsulated with an epoxy resin and thus was obtained a solid electrolytic capacitor of Example 1.

EXAMPLE 2

The same procedure as in Example 1 was taken to fabricate a solid electrolytic capacitor of Example 2, except that 0.5 g of synthetic graphite powder was used in place of 0.5 g of natural graphite powder in Example 1 for depositing a carbon layer of synthetic graphite on the surface of the dielectric layer of aluminum oxide.

EXAMPLE 3

The same procedure as in Example 1 was taken to fabricate a solid electrolytic capacitor of Example 3, except that 0.5 g of coke powder was used in place of 0.5 g of natural graphite powder in Example 1 for depositing a carbon layer of coke on the surface of the dielectric layer of aluminum oxide.

EXAMPLE 4

The same procedure as in Example 1 was taken to fabricate a solid electrolytic capacitor of Example 4, except that 0.5 g of carbon nanotube powder was used in place of 0.5 g of natural graphite powder in Example 1 for depositing a carbon layer of carbon nanotube on the surface of the dielectric layer of aluminum oxide.

EXAMPLE 5

The same procedure as in Example 1 was taken to fabricate a solid electrolytic capacitor of Example 5, except that 0.5 g of acetylene black powder was used in place of 0.5 g of natural graphite powder in Example 1 for depositing a carbon layer of acetylene black on the surface of the dielectric layer of aluminum oxide.

EXAMPLE 6

Example 6 used potassium-doped fullerene in place of the natural graphite powder in Example 1 for overlaying a carbon layer on the dielectric layer of aluminum oxide. The potassium-doped fullerene was prepared as follows.

In a vacuum environment, 100 Torr of helium gas was filled and arc discharge from graphite as an electrode was produced to deposit a substance. The resultant substance was stirringly mixed with toluene for 30 minutes. The resultant solution was filtered to remove impurities and toluene contained in the filtrate was evaporated to obtain fullerene ($C_{60}$).

In a glove box, the resultant fullerene and potassium were weighed in a molar ratio of 3:1 and sealed in a glass tube which was heated to 800° C. for diffusing potassium in fullrerene. Thus was obtained potassium-doped fullerene.

That is, a solid electrolytic capacitor of Example 6 was fabricated the same way as in Example 1, except that 0.5 g of potassium-doped fullerene thus obtained was used to deposit a carbon layer of potassium-doped fullerene on the surface of the dielectric layer of aluminum oxide.

COMPARATIVE EXAMPLE 1

In Comparative Example 1, an aluminum foil having a thickness of 60 $\mu$m was anodized to form a dielectric layer of aluminum oxide on a surface of the aluminum electrode of aluminum foil.

The aluminum electrode formed with the dielectric layer of aluminum oxide was immersed, in vacuo, in an aqueous solution containing 0.04 mol/l of ammonium persulfate and then was dried.

Subsequently, the aluminum electrode formed with the dielectric layer of aluminum oxide was immersed in an acetonitrile solution containing 2 mol/l of pyrrole monomer in vacuo for 10 minutes, thereby carrying out chemical oxidative polymerization for overlaying a polypyrrole thin film on the dielectric layer of aluminum oxide.

The aluminum electrode having the polypyrrole thin film laid over the dielectric layer of aluminum oxide was used as the anode whereas an SUS electrode was used as the cathode. These electrodes were immersed in an aqueous solution containing pyrrole monomer (0.2 mol/l), oxalic acid (0.02 mol/l), and tetrabutylammonium toluenesulfonic acid, as an electrolyte, (0.05 mol/l) to carry out electrolysis at a rated current having a current density of 0.5 mA/cm$^2$ for 150 minutes. In this manner, polypyrrole was further deposited on the dielectric layer of aluminum oxide.

Subsequently, a silver paste was applied to the resultant polypyrrole overlaid on the dielectric layer of aluminum oxide so as to form a counter electrode. The resultant assembly was encapsulated with an epoxy resin and thus was obtained a solid electrolytic capacitor of Comparative Example 1.

The resultant solid electrolytic capacitors of Examples 1 to 6 and Comparative Example 1 were each determined for the equivalent series resistance at 100 kHz in accordance with JIS C 5101. An index number of the equivalent series resistance of each of the solid electrolytic capacitors was determined on a basis of the equivalent series resistance of Example-1 solid electrolytic capacitor defined as 100. The results are listed in Table 1 as below.

TABLE 1

| | ANODE MATERIAL | INDEX NUMBER OF EQUIVALENT SERIES RESISTANCE |
|---|---|---|
| EXAMPLE 1 | Al | 100 |
| EXAMPLE 2 | Al | 98 |
| EXAMPLE 3 | Al | 102 |
| EXAMPLE 4 | Al | 98 |
| EXAMPLE 5 | Al | 101 |
| EXAMPLE 6 | Al | 99 |
| COMPARATIVE EXAMPLE 1 | Al | 130 |

As apparent from the table, the solid electrolytic capacitors of Examples 1 to 6 are improved in the high frequency characteristics with notably decreased equivalent series resistances as compared with the solid electrolytic capacitor of Comparative Example 1 having polypyrrole overlaid on the dielectric layer of aluminum oxide formed on the surface of the metal electrode of aluminum, the capacitors of Examples 1 to 6 having the respective carbon layer of natural graphite, synthetic graphite, coke, carbon nanotube, acetylene black and potassium-doped fullerene deposited on the dielectric layer of aluminum oxide thereof formed on the surface of the metal electrode of aluminum.

EXAMPLE 7

Example 7 took the same procedure as Example 1, except that tantalum was used in place of aluminum in Example 1 as the material for the metal electrode used as the anode. That is, the metal electrode of tantalum was anodized to form a dielectric layer of tantalum oxide on the surface thereof and then, a carbon layer of natural graphite was overlaid on the dielectric layer. Thus was fabricated a solid electrolytic capacitor of Example 7.

EXAMPLE 8

Example 8 took the same procedure as Example 1, except that niobium was used in place of aluminum in Example 1 as the material for the metal electrode used as the anode. That is, the metal electrode of niobium was anodized to form a dielectric layer of niobium oxide on the surface thereof and then, a carbon layer of natural graphite was overlaid on the dielectric layer. Thus was fabricated a solid electrolytic capacitor of Example 8.

EXAMPLE 9

Example 9 took the same procedure as Example 1, except that titanium was used in place of aluminum in Example 1 as the material for the metal electrode used as the anode. That is, the metal electrode of titanium was anodized to form a dielectric layer of titanium oxide on the surface thereof and then, a carbon layer of natural graphite was overlaid on the dielectric layer. Thus was fabricated a solid electrolytic capacitor of Example 9.

EXAMPLE 10

Example 10 took the same procedure as Example 1, except that an aluminum-vanadium alloy having an aluminum-to-vanadium weight ratio of 99.5:0.5 was used in place of aluminum in Example 1 as the material for the metal electrode used as the anode. That is, the metal electrode of aluminum-vanadium alloy was anodized to form a dielectric layer of an oxide of the alloy on the surface thereof and then, a carbon layer of natural graphite was overlaid on the dielectric layer. Thus was fabricated a solid electrolytic capacitor of Example 10.

COMPARATIVE EXAMPLE 2

Comparative Example 2 took the same procedure as Comparative Example 1, except that tantalum was used in place of aluminum in Comparative Example 1 as the material for the metal electrode used as the anode. That is, the metal electrode of tantalum was anodized to form a dielectric layer of tantalum oxide on the surface thereof and then, polypyrrole was deposited on the dielectric layer. Thus was fabricated a solid electrolytic capacitor of Comparative Example 2.

COMPARATIVE EXAMPLE 3

Comparative Example 3 took the same procedure as Comparative Example 1, except that niobium was used in place of aluminum in Comparative Example 1 as the material for the metal electrode used as the anode. That is, the metal electrode of niobium was anodized to form a dielectric layer of niobium oxide on the surface thereof and then, polypyrrole was deposited on the dielectric layer. Thus was fabricated a solid electrolytic capacitor of Comparative Example 3.

COMPARATIVE EXAMPLE 4

Comparative Example 4 took the same procedure as Comparative Example 1, except that titanium was used in place of aluminum in Comparative Example 1 as the material for the metal electrode used as the anode. That is, the metal electrode of titanium was anodized to form a dielectric layer of titanium oxide on the surface thereof and then, polypyrrole was deposited on the dielectric layer. Thus was fabricated a solid electrolytic capacitor of Comparative Example 4.

COMPARATIVE EXAMPLE 5

Comparative Example 5 took the same procedure as Comparative Example 1, except that an aluminum-vanadium alloy having an aluminum-to-vanadium weight ratio of 99.5:0.5 was used in place of aluminum in Comparative Example 1 as the material for the metal electrode used as the anode. That is, the metal electrode of aluminum-vanadium alloy was anodized to form a dielectric layer of an oxide of the alloy on the surface thereof and then, polypyrrole was deposited on the dielectric layer. Thus was fabricated a solid electrolytic capacitor of Comparative Example 5.

Each of the resultant solid electrolytic capacitors of Examples 7 to 10 and Comparative Examples 2 to 5 was also determined for the equivalent series resistance at 100 kHz in accordance with JIS C 5101. For comparison between Example 7 and Comparative Example 2; Example 8 and Comparative Example 3; Example 9 and Comparative Example 4; and Example 10 and Comparative Example 5, the respective pairs employing the metal electrode of the same material as the anode, the solid electrolytic capacitors of Comparative Examples 2 to 5 were respectively determined for the index number of equivalent series resistance on a basis of the respective equivalent series resistance of those of Examples 7 to 10 defined as 100. The results are listed in Table 2 as below.

TABLE 2

| | ANODE MATERIAL | INDEX NUMBER OF EQUIVALENT SERIES RESISTANCE |
|---|---|---|
| EXAMPLE 7 | Ta | 100 |
| COMPARATIVE EXAMPLE 2 | Ta | 140 |
| EXAMPLE 8 | Nb | 100 |
| COMPARATIVE EXAMPLE 3 | Nb | 130 |
| EXAMPLE 9 | Ti | 100 |
| COMPARATIVE EXAMPLE 4 | Ti | 135 |
| EXAMPLE 10 | Al-V | 100 |
| COMPARATIVE EXAMPLE 5 | Al-V | 140 |

As apparent from the table, the solid electrolytic capacitors of Examples 7 to 10 are improved in the high frequency characteristics with notably decreased equivalent series resistances in high frequency regions as compared with the solid electrolytic capacitors of Comparative Examples 2 to 5 having polypyrrole deposited on the respective dielectric layers thereof, the capacitors of Examples 7 to 10 having the carbon layer of natural graphite overlaid on the respective dielectric layers formed by oxidizing the respective surfaces of the metal electrodes of tantalum, niobium, titanium and aluminum alloy.

Similar effects may be obtained when a tantalum alloy, niobium alloy, or titanium alloy is used in place of the aforesaid aluminum alloy as the material for forming the metal electrode used as the anode, or when any other element than vanadium is used as the alloying metal.

Furthermore, similar effects may be obtained when any of the carbon materials including synthetic graphite, coke, carbon nanotube, acetylene black and potassium-doped fullerene is deposited on the individual dielectric layers formed by oxidizing the individual surfaces of the above metal electrodes.

Although the present invention has been fully described by way of examples, it is to be noted that various changes and modifications will be apparent to those skilled in the art.

Therefore, unless otherwise such changes and modifications depart from the scope of the invention, they should be construed as being included therein.

What is claimed is:

1. A solid electrolytic capacitor comprising: a metal electrode; a dielectric layer comprising an oxide of the metal and formed on a surface of the metal electrode; and a carbon material layer deposited on a surface of the dielectric layer.

2. The solid electrolytic capacitor as claimed in claim 1, wherein the dielectric layer is formed by anodizing the metal electrode.

3. The solid electrolytic capacitor as claimed in claim 1, wherein the carbon material layer is formed by electrophoresis using the metal electrode formed with the dielectric layer as an anode.

4. The solid electrolytic capacitor as claimed in claim 1, wherein the metal constituting the metal electrode is at least one type selected from the group consisting of aluminum, tantalum, niobium, titanium and alloys thereof.

5. The solid electrolytic capacitor as claimed in claim 1, wherein the carbon material is at least one type selected from the group consisting of natural graphite, synthetic graphite, coke, carbon nanotube, acetylene black and metal-doped fullerene.

6. A solid electrolytic capacitor comprising:
a metal electrode;
a dielectric layer comprising an oxide of the metal and formed on a surface of the metal electrode; and
a carbon material layer overlaid on the dielectric layer,
wherein the carbon material is at least one type selected from the group consisting of natural graphite, synthetic graphite, coke, carbon nanotube, acetylene black and metal-doped fullerene,
wherein the carbon material is the metal-doped fullerene and the metal-doped fullerene includes an alkali metal.

* * * * *